(12) United States Patent
Hewitt

(10) Patent No.: US 8,152,076 B2
(45) Date of Patent: Apr. 10, 2012

(54) DEVICE FOR COLLECTING AND DISPENSING ROOF RAIN WATER

(76) Inventor: Cory Austin Hewitt, Sioux Falls, SD (US)

( * ) Notice: Subject to any disclaimer, the term of this patent is extended or adjusted under 35 U.S.C. 154(b) by 167 days.

(21) Appl. No.: 12/378,582

(22) Filed: Feb. 18, 2009

(65) Prior Publication Data

US 2010/0206397 A1  Aug. 19, 2010

(51) Int. Cl.
*B05B 1/24* (2006.01)
(52) U.S. Cl. .......... 239/135; 239/63; 239/302; 210/232; 210/416.1; 210/474
(58) Field of Classification Search .................. 239/289, 239/135, 63, 302; 137/357; 290/1; 210/232, 210/416.1, 474; 219/438
See application file for complete search history.

(56) References Cited

U.S. PATENT DOCUMENTS

| | | | | |
|---|---|---|---|---|
| 4,908,501 A * | 3/1990 | Arnold, III | ..................... | 219/438 |
| 7,025,879 B1 * | 4/2006 | Ticknor | ......................... | 210/232 |
| 7,066,197 B1 * | 6/2006 | Gray et al. | .................... | 137/357 |
| 7,309,926 B2 * | 12/2007 | Watt | .............................. | 290/1 R |

* cited by examiner

*Primary Examiner* — Dinh Nguyen
*Assistant Examiner* — Viet Le

(57) ABSTRACT

The container is mounted onto the structure and attached to the bottom of the rain gutter. It collects rain gutter water and pumps the water out across the lawn area using a battery/solar powered system, using a sump pump with hoses and nozzles. It also keeps leaves and debris from collecting in the unit and thus expelling them out of the unit using a debris disposal mechanism which is also powered by the battery/solar system. The container is mounted to the structure using a T-channel bracket with shims. The solar panel is mounted onto the unit and is used to charge the battery which is inside the container.

It eliminates the need for downspouts making them obsolete using a revolutionary way to properly disperse rain water. It eliminates foundation erosion and dead grass areas.

1 Claim, 6 Drawing Sheets

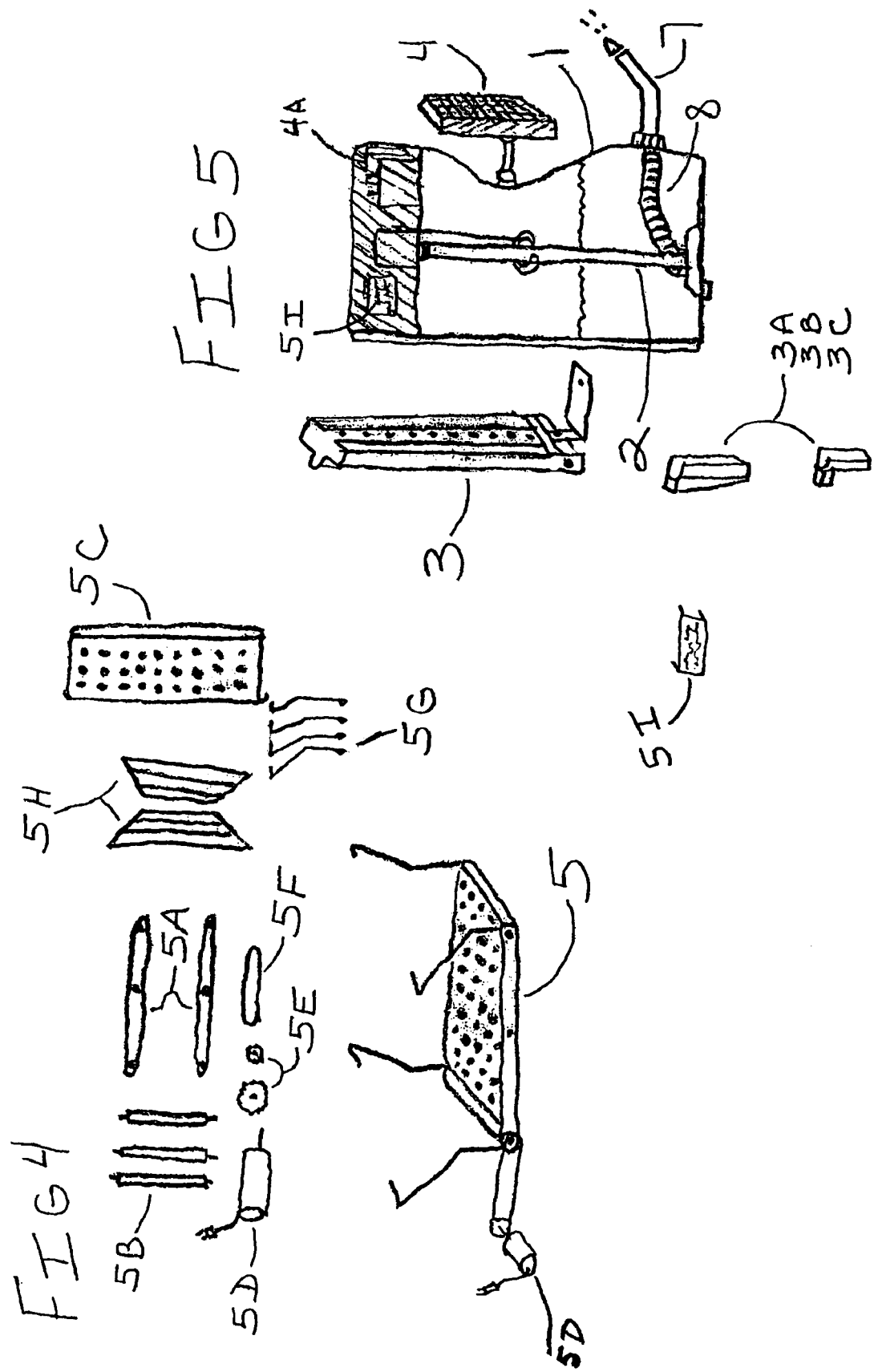

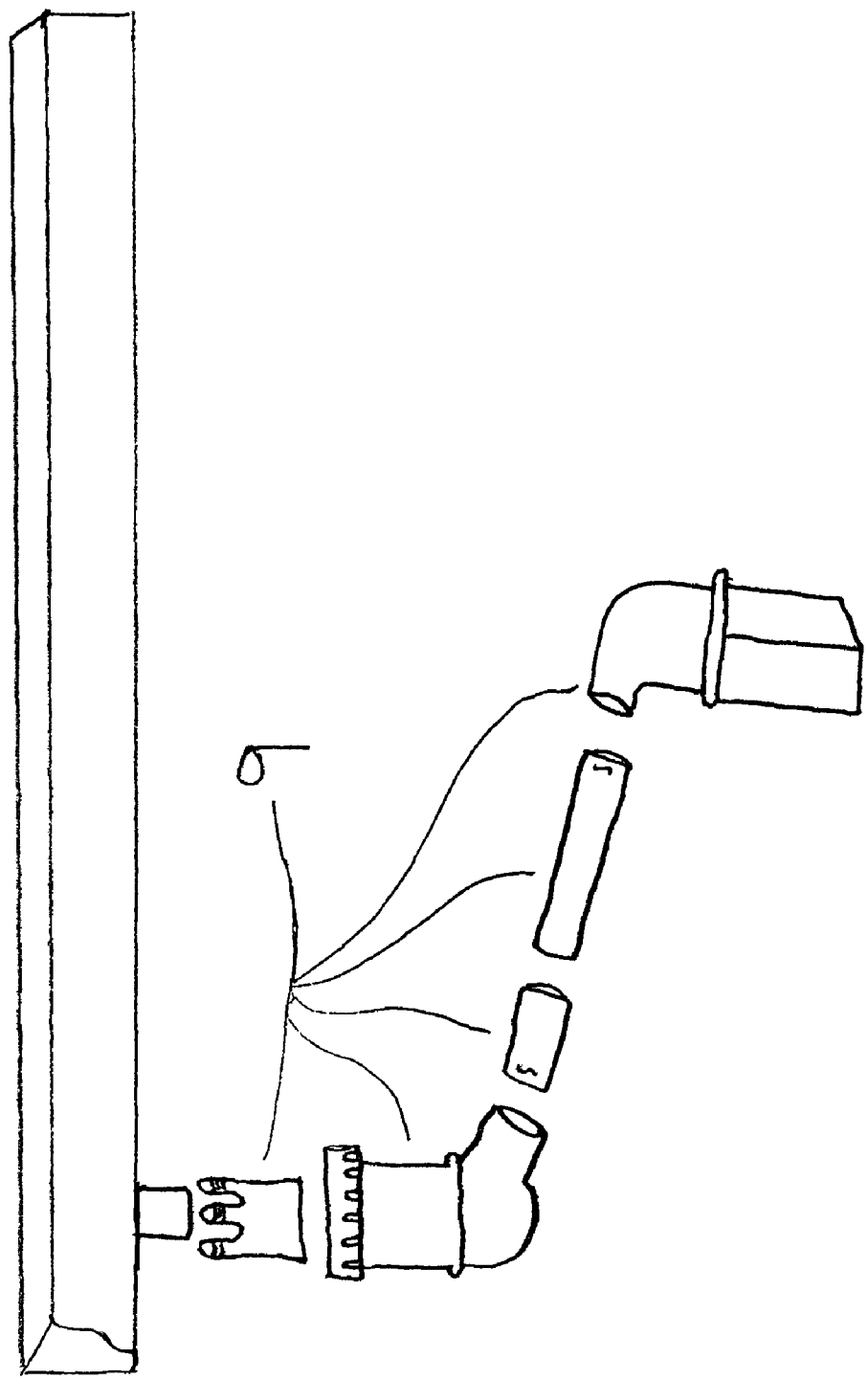

DEVICE FOR COLLECTING AND DISPENSING ROOF RAIN WATER

BACKGROUND

As it rains, the water goes down the gutter to the inlet port and runs into the high density container. As the container fills, it turns on the sump pump and sprays out of the nozzles distributing the rain water gently across the yard area up to 25 feet away from the building. As it is running, it activates a circuit/sensor system which runs intermittently and runs the debris disposal system that discards the leaves and debris out of the system. It also activates the heat tape which is imbedded throughout the container to keep the sump pump, nozzles and hoses and the debris disposal system from freezing during cold weather conditions. The nozzles have several settings and can be adjusted from a surge spray all the way down to a light mist. (A possible optional feature would be that the nozzles could be set to ratchet from left to right for wider distribution across the lawn area.)

The high density container is uniquely designed with three openings. The first is hidden under the hinged removable access lid which houses an access panel to the sump pump and battery. The second opening located on top of the unit is where the debris disposal mechanism inlet port is attached to the unit. The third opening on the side, is fitted with an exterior frame mount with a cover door. This is where the debris is discarded from the unit. The unit may be fitted with an external thermal covering. The unit is also designed with a unique T-track channel on the back of the unit for easy and secure installation on the building.

The suspended debris disposal system may be redesigned to work even more efficiently.

Install the form fitting/swivel inlet port that connects the unit to the above gutter. Next, push the high density container snug into end of inlet port. Mark the position on the siding. Remove the container and install the T-channel bracket onto the siding using the siding support shims and screws provided. Next, slide the container from the bottom of the T-channel bracket up and into place until the inlet port is again snug. Swing the bottom hinge of the T-channel bracket up underneath the high density container and secure with the screws provided, locking it into place on the bracket. Next, install the battery into the unit and hook up the connections. Next, close the hinged access lid and lock shut. Next, adjust the telescoping/rotating solar panel to draw maximum sunlight. Next, screw on the nozzles and adjust to the proper left or right operating position and pressure settings.

BRIEF DESCRIPTION OF THE DRAWINGS

The invention will be better understood and the objects other than those set forth above will become apparent when considering the following detailed description thereof. The description makes reference to the collective drawings wherein:

FIG. 4 is a complete view and an exploded view of the debris disposal mechanism Collectively with the parts that are involved in its assembly.

FIG. 5 is a side perspective view of the high density container collectively with the internal and external parts and attachments of the invention and includes a view of the perforated T-channel bracket and siding support shims.

FIG. 6 is a side perspective view of the roof rain gutter and the form fitting inlet port with swivel neck connection and extensions.

DESCRIPTION OF EMBODIMENT PREFERRED

Figure 1:
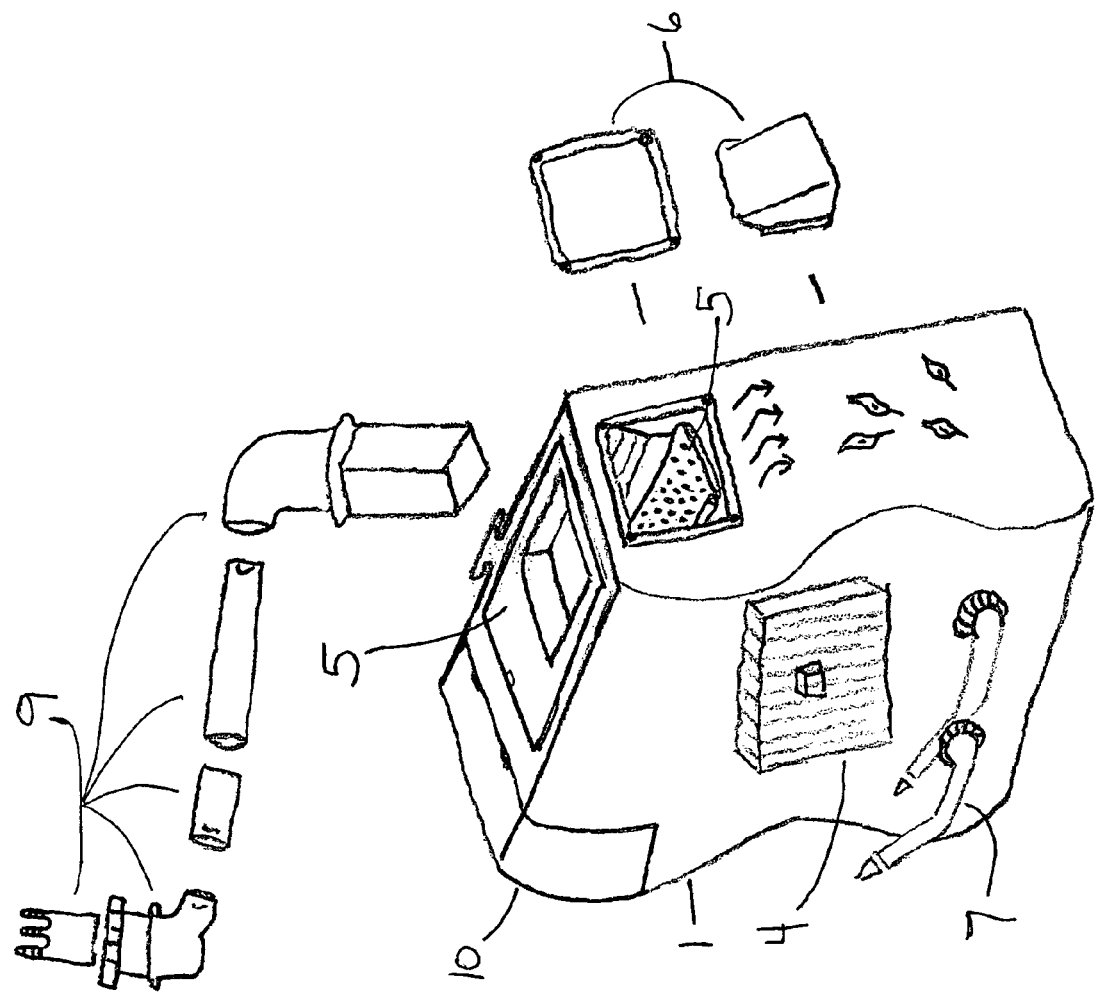
FIG. 1 is a perspective view of the new revolutionary roof rainwater collecting and dispensing system according to the present invention and collectively includes a view of the internal debris disposal mechanism, a view of the form fitting/swivel inlet port with connectors and a view of the exterior frame mount and cover.
Figure 2:
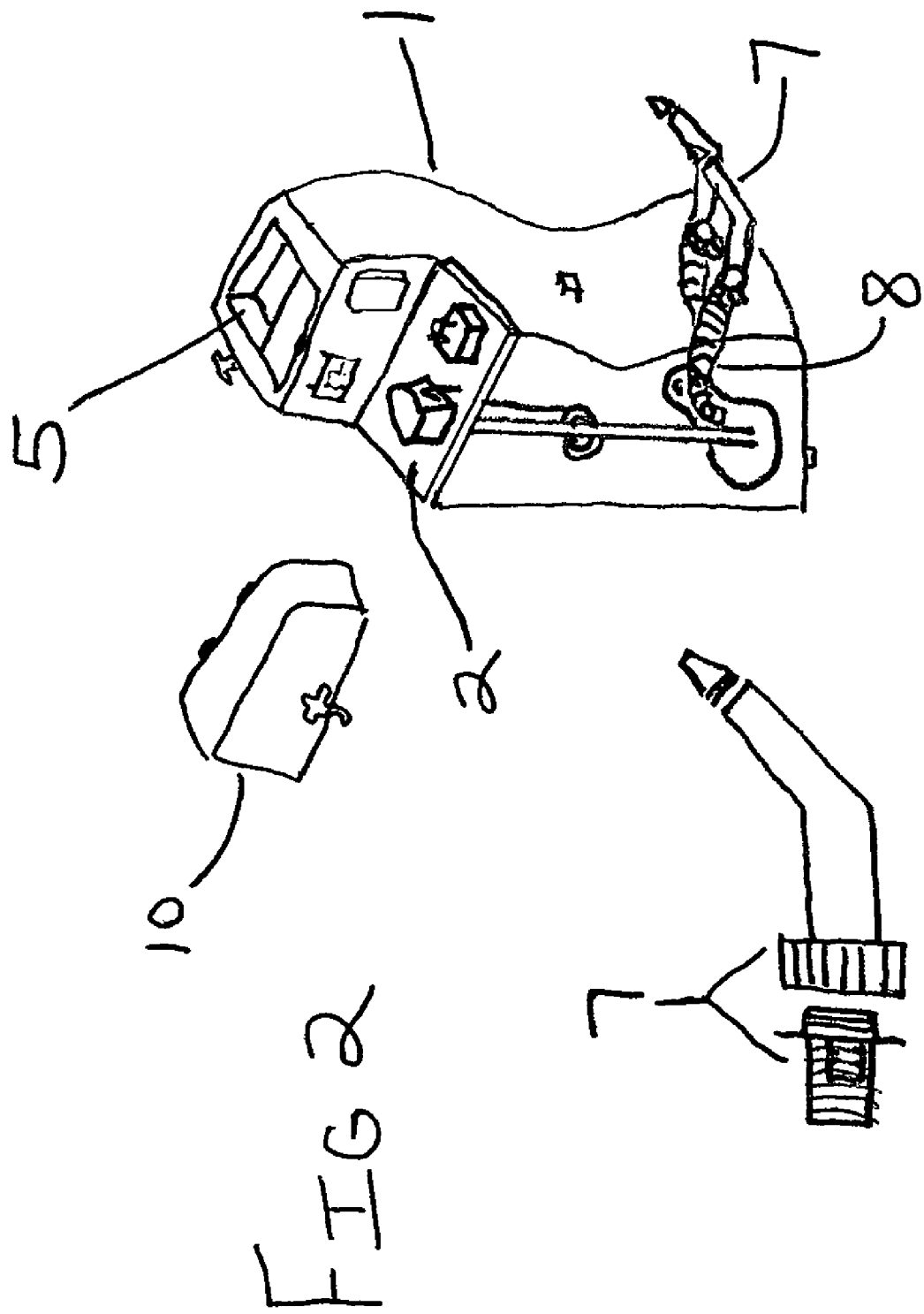
FIG. 2 is a side perspective view of the container, conduits, access lid and nozzles of the invention.
Figure 3:
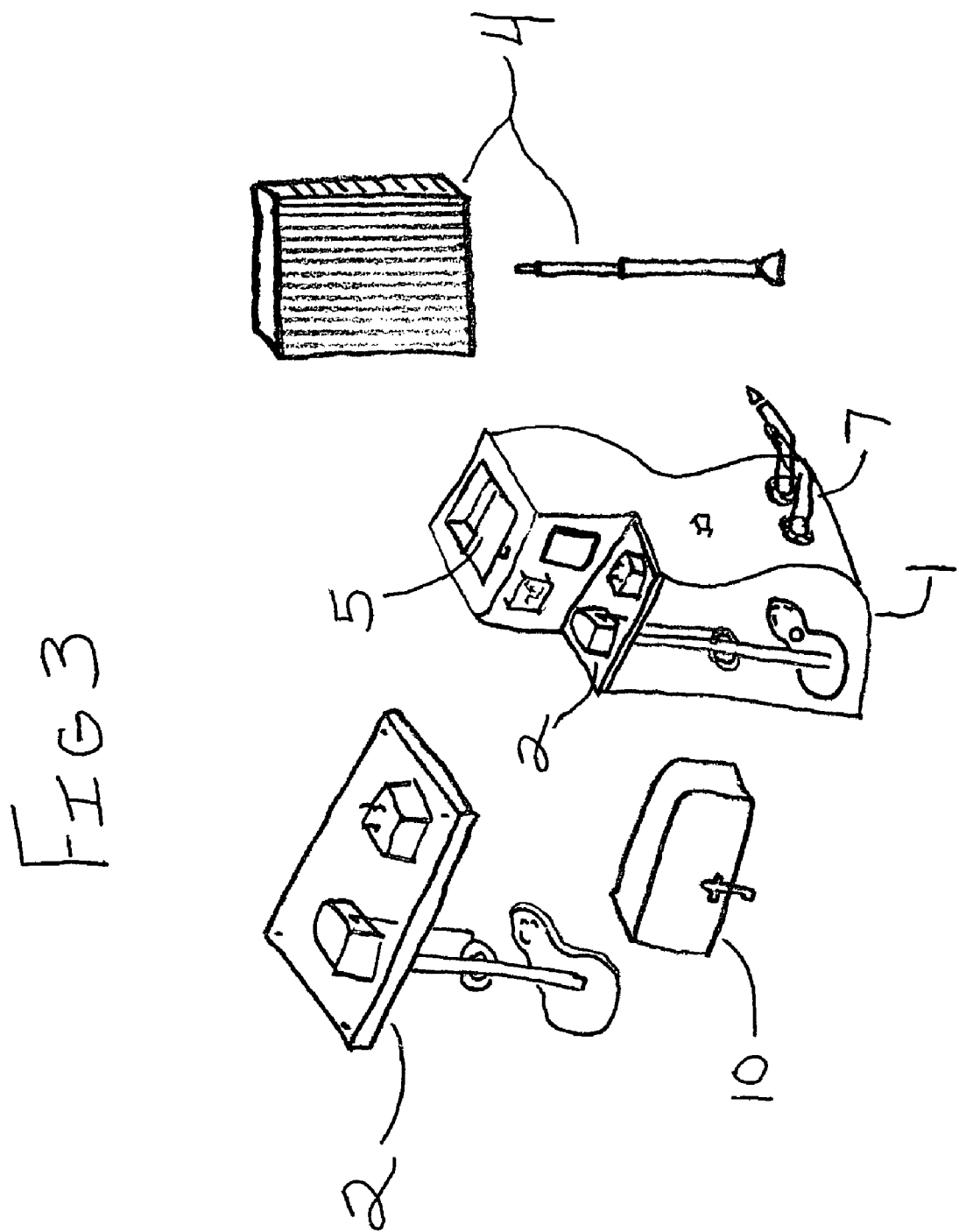
FIG. 3 is a side perspective view of the container, with an exploded view of the sump pump/battery pack, lid and the solar panel with telescoping/rotating solar panel attachment.
Figure 7:
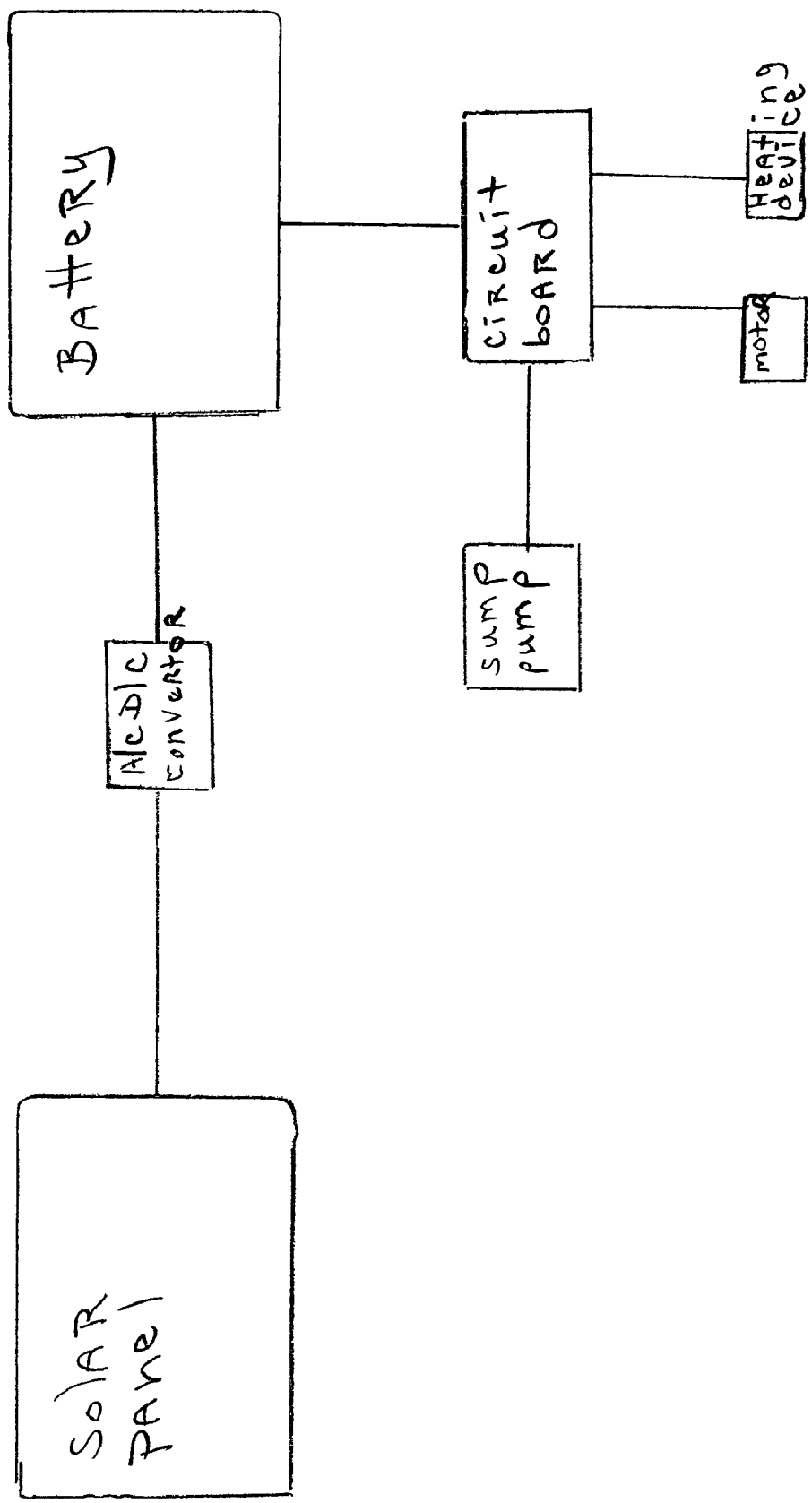
FIG. 7 is a basic wiring diagram.

With reference to the drawings and in particular to FIG. 1 through FIG. 7 thereof, a Revolutionary way to collect and dispense roof rain water as best described through Numbers 1 through 11.

The rainwater collection and dispensation system comprises of high density container (1) being mounted to the structure using a perforated T-channel bracket (3) using a choice of one of the following siding shim options (3A, 3B or 3C) depending on the type of siding the structure has, either regular siding or a flat surface such as brick or stucco. Once the perforated T-channel bracket (3) is mounted to the structure using the appropriate shim option (3A, 3B or 3C), then the high density container (1) is slid from the bottom of the perforated T-channel bracket (3) up and into place. Then swing the bottom hinge of the perforated T-channel bracket (3) up underneath the high density container (1) and secure into place using the installation screws that are provided.

The high density container (1) is then conventionally connected to the rain gutter Collectively using the pieces of the form fitting inlet port with swivel neck connection and extensions, and secured to the structure when it is installed onto the T-channel bracket.

The sump/battery pack combination (2) is positioned under the removable hinged sump/battery access lid (10) and is conventionally wired to operate and dispense the rain water out across the lawn area through the sump hose (8) and adjustable nozzles. (7)

The solar panel (4) with adjustable/telescoping bracket and AC/DC convertor (4a), charges the battery of the sump/battery pack combination (2), which in turn intermittently activates an internal circuit/sensor system (5i) (circuit board) that operates the suspended debris disposal mechanism (5) thus dispensing leaf and debris material out of the unit. A heating device to prevent the water from freezing is connected to the electrical circuit.

As to further discussion of the manner of usage and operation of the present invention, the same should be apparent from the above description. Accordingly, no further discussion relating to the manner of usage and operation will be provided.

With respect to the above description, it is to be realized that the optimum Dimensional relationships for the parts of the invention, to include variations in size, materials, shape, form, function and manner of operation, assembly and use, are deemed readily apparent and obvious to one skilled in the art and all equivalent relationships to those illustrated in the drawings and described in the specifications are intended to be encompassed by the present invention.

The foregoing is considered as illustrative only of the principles of the rainwater collection and dispensation system. Further, since numerous modifications and changes will readily occur to those skilled in the art, it is not desired to limit the invention to the exact construction and operation shown and described. Accordingly, all suitable modifications and equivalents may be resorted to falling within the scope of the invention.

PARTS AND COMPONENTS

1. High density insulated water receiving container.
2. Sump pump/battery pack combination (removable to allow installation)
3. T-channel bracket.
   a. Siding support shims.
   b. Brick support shims.
   c. Stucco support shims.
4. Solar panel with rotating/telescoping bracket.
   a. A/C D/C convertor.
5. Suspended debris disposal mechanism including insert.
   a. Side brackets.
   b. Rollers
   c. Perforated belt
   d. Motor
   e. Large and small pulleys
   f. Pulley belt
   g. Suspension brackets
   h. Snap on debris wing brackets
   i. Debris and heat tape circuit board.
6. Exterior frame mount and cover.
7. Adjustable nozzles with thread to barb fittings and hoses.
8. Sump hose.
9. Form fitting inlet port with swivel neck connection and extensions
10. Removable hinged sump/battery access lid.

The invention claimed is:

1. A device to collect and dispense roof rain water comprising:
   a container to collect water having an opening;
   a pump to drive the water out of the container;
   a debris disposal mechanism;
   a sensor to measure the water level, wherein the pump is activated at a specific water level;
   an electrical circuit to power the pump which is powered by a rechargable battery pack;
   a solar panel connected to the electrical circuit to charge the rechargeable battery pack;
   a heating device to keep the water within the container from freezing;
   spray nozzles fluidily connected to the pump to disperse the water out of the container;
   a T-channel bracket that is mounted to a building surface, wherein the T-channel bracket comprises: perforations, a bottom hinge, a back surface and a front surface, wherein the back surface is attached directly to the building surface and the container is attached to the front surface, and the bottom hinge is secured to the container.

* * * * *